(12) United States Patent
Okada et al.

(10) Patent No.: US 6,893,103 B2
(45) Date of Patent: May 17, 2005

(54) INK JET RECORDING APPARATUS AND MANUFACTURING METHOD FOR FUNCTIONAL LIQUID APPLIED SUBSTRATE

(75) Inventors: Nobuko Okada, Suwa (JP); Yutaka Takano, Asahi-mura (JP); Hiroshi Kiguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/977,339

(22) Filed: Oct. 16, 2001

(65) Prior Publication Data

US 2002/0054197 A1 May 9, 2002

(30) Foreign Application Priority Data

Oct. 17, 2000 (JP) .................................... 2000-316954
Oct. 16, 2001 (JP) .................................... 2001-318215

(51) Int. Cl.⁷ ............................................... B41J 29/38
(52) U.S. Cl. ............................ 347/10; 347/11; 347/12; 347/13
(58) Field of Search ......................... 347/10, 9, 12, 347/13, 11, 101; 445/6

(56) References Cited

U.S. PATENT DOCUMENTS

| 4,364,069 A | | 12/1982 | Kobayashi ................. 346/140 |
| 5,069,733 A | * | 12/1991 | Nill et al. ....................... 156/67 |
| 5,157,411 A | * | 10/1992 | Takekoshi et al. ............ 346/1.1 |
| 5,266,965 A | * | 11/1993 | Komai et al. ................. 346/1.1 |
| 5,946,012 A | * | 8/1999 | Courian et al. ............... 347/63 |
| 6,074,052 A | * | 6/2000 | Inui et al. ..................... 347/101 |
| 6,126,273 A | * | 10/2000 | Van Vooren et al. ......... 347/54 |
| 6,210,245 B1 | * | 4/2001 | Sando et al. ..................... 445/6 |
| 6,283,813 B1 | * | 9/2001 | Kaneko et al. ............... 445/24 |
| 6,302,517 B1 | * | 10/2001 | Kanaya ........................ 347/41 |
| 6,409,300 B2 | * | 6/2002 | Imanaka et al. .............. 347/19 |
| 6,428,134 B1 | * | 8/2002 | Clark et al. ................... 347/10 |

FOREIGN PATENT DOCUMENTS

| EP | 0 822 087 A2 | 2/1998 |
| JP | A 10-12377 | 1/1998 |
| JP | A 10-119283 | 5/1998 |
| JP | A 10-202851 | 8/1998 |
| JP | A-11-58704 | 3/1999 |
| JP | A 11-160528 | 6/1999 |
| JP | 2001-038892 | 2/2001 |

* cited by examiner

*Primary Examiner*—Hai Pham
*Assistant Examiner*—Lam S Nguyen
(74) *Attorney, Agent, or Firm*—Oliff & Berridge, PLC

(57) ABSTRACT

An ink jet printing device and a manufacturing method of a functional liquid applied substrate, which can equalize the discharge amount of the functional liquid with simple operations and structures. An ink jet printing device (100) comprises a plurality of nozzles (111) for discharging the functional liquid and the plurality of nozzles are divided into a plurality of groups, the number of the groups being less than the number of the nozzles, and the discharge amount of the functional liquid discharged from the nozzles is controlled in every group. A manner of grouping of the nozzles is performed such that a part of an ink jet head (1a), onto which the nozzles are located, is divided into a plurality of areas and those nozzles belonging to each area belong to one group.

14 Claims, 8 Drawing Sheets

1a: INK JET HEAD (a)

(b)

INK JET RECORDING APPARATUS AND MANUFACTURING METHOD FOR FUNCTIONAL LIQUID APPLIED SUBSTRATE

BACKGROUND OF THE INVENTION

1. Field of the Invention

This invention relates to an ink jet recording apparatus capable of uniformly discharging a functional liquid such as an ink or a solution of EL (electroluminescence) light emitting material, to a manufacturing method for functional liquid applied substrates such as color filters or EL element substrates used in display devices, and to a manufacturing method for devices or electronic equipment such as an electro-optical apparatus comprising such functional liquid applied substrates.

2. Description of the Related Art

As a method for manufacturing a functional liquid applied substrate used in a display device, that of inducting the functional liquid by an ink Jet method into pixels formed by partitioning with banks on a substrate is known. With this functional liquid applied substrate, it is necessary to make the amount of functional liquid discharged to each pixel as uniform as possible and to minimize irregularities between pixels.

In Japanese Patent Application Laid-Open No. H11-58074, there is a description of controlling the drive voltage on the basis of variation compensation data produced by making measurements beforehand for each nozzle, in order to compensate for variation in ink discharge amounts between nozzles.

In Japanese Patent Application Laid-Open No. H11-58704, however, compensation data must be produced for each nozzle, an operation which involves time and trouble. Also, because it is necessary to provide drive voltage control means separately for each nozzle, the circuit configuration must of necessity be made complex.

In cases where it is not necessary to make the variation in discharge amount absolutely 0, on the other hand, there is no need to provide for such a complex and time-consuming configuration as that described above. The targeted value for film thickness irregularity is ±1.5% or less in a 64-tone EL element substrate, ±3% or less in a 32-tone EL element substrate, ±6% or less in a 16-tone EL element substrate, and ±5% or less in a color filter, for example, and there is a range of tolerance of some degree allowed for the variation in coating film thickness on functional liquid applied substrates.

An object of the present invention is to provide both an ink jet recording apparatus capable of making the amount of functional liquid discharge uniform with procedures and a configuration that are simple, and a functional liquid applied substrate manufacturing method.

SUMMARY OF THE INVENTION

In order to resolve the problems noted in the foregoing, the ink jet recording apparatus of the present invention comprises a plurality of nozzles for discharging a functional liquid, the plurality of nozzles is divided into a plurality of groups, the number whereof is fewer than the number of nozzles, and the amounts of functional liquid discharged from the nozzles is controlled group by group. Thus, because it is made possible to regulate group by group instead of nozzle by nozzle, the compensation value selection operation and circuit configuration are simplified while a uniformity in discharge quantity between nozzles can be secured.

In the ink jet recording apparatus described above, the functional liquid may be an ink and it may be used for manufacturing a color filter. Alternatively, in the ink jet recording apparatus described above, the functional liquid may be a solution of an EL light emitting material, and it may be possible to manufacture an EL element substrate. The functional liquid may also be an electrically conducting particle dispersion solution, and it may be possible to manufacture a substrate comprising a conducting wiring pattern.

In the ink jet recording apparatus described above, it is preferable that the positions on the ink jet head where the plurality of nozzles is arranged be divided into a plurality of areas, and that the nozzles belonging to each area be made to belong to a single group by applying the same waveform to the nozzles belonging to the same area, utilizing the fact that nozzles positioned in proximity exhibit mutually similar discharge characteristics, discharge quantities between nozzles can effectively be made uniform.

In the ink jet recording apparatus described above, it is also preferable that the ink jet head wherein the plurality of nozzles is arranged, have a cavity provided for each of the nozzles, a reservoir that communicates with the cavities and is common to the nozzles, and a supply port for supplying functional liquid to the reservoir, and that the plurality of groups comprise at least a first group comprising those nozzles of the plurality of nozzles that are positioned near the supply port, and a second group comprising those nozzles of the plurality of nozzles that are positioned far from the supply port. Using the characteristic that the ink discharge quantity is influenced by the distance from the supply port to the nozzle, nozzle group division can be effected according to the distance from the supply port, and the discharge effectively made uniform between nozzles.

In the method of the present invention for manufacturing functional liquid applied substrates, an ink jet recording apparatus comprises a plurality of nozzles capable of discharging a functional liquid, the plurality or nozzles is divided into a plurality of groups, the number whereof is fewer than the number of nozzles, signal waveforms controlling the discharge of the functional liquid from the nozzles are regulated group by group, and the functional liquid is discharged into the pixels formed on the substrate.

In the manufacturing method described above, it is preferable that the positions on the ink jet head where the plurality of nozzles is arranged be divided into a plurality of areas, and that the nozzles belonging to each area be made to belong to a single group.

It is also preferable that, in the manufacturing method described above, the ink jet head wherein the plurality of nozzles is arranged have a cavity provided for each of the nozzles, a reservoir that communicates with each of the cavities and is common to the nozzles, and a supply port for supplying functional liquid to the reservoir, and that the plurality of groups comprise at least a first group comprising those nozzles of the plurality of nozzles that are positioned near the supply port, and a second group comprising those nozzles of the plurality of nozzles that are positioned far from the supply port.

The device manufacturing method of the present invention, moreover, is one wherein a functional liquid applied substrate manufactured by the manufacturing method described above is provided.

The device of the present invention, moreover, is one wherein a functional liquid applied substrate manufactured by the manufacturing method described above is provided.

And the electronic equipment manufacturing method of the present invention is one wherein a device such as an electro-optical apparatus manufactured by the manufacturing method described above is used.

Figure 1:
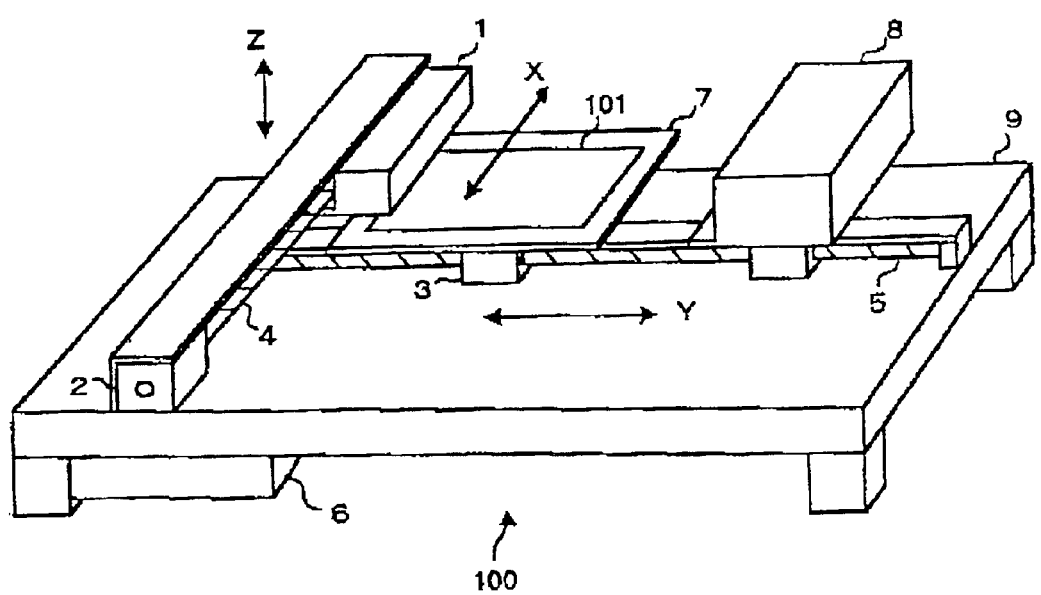
FIG. 1 is a simplified diagonal view of an ink jet recording apparatus according to one embodiment of the present invention.

In the drawings, the symbol 100 represents an ink jet recording apparatus, 1a an ink jet head, 111 a nozzle, 121 a cavity, 123 a reservoir, 200 a color filter (functional liquid applied substrate), 300 a color liquid crystal display device (electro-optical apparatus), and 500 a personal computer (electronic equipment).

DESCRIPTION OF THE PREFERRED EMBODIMENTS

Below, as an embodiment of the present invention, an example of an apparatus and of a method for manufacturing a color filter wherein ink that is one example of a functional liquid is applied to a substrate is described.

(1. Configuration of Manufacturing Apparatus)

FIG. 1 is a simplified diagonal view of an ink jet recording apparatus according to one embodiment of the present invention. As diagrammed in this figure, an ink jet recording apparatus 100 comprises a set of ink jet head 1, an X-dimension drive shaft 4, a Y-dimension guide shaft 5, a controller 6, a mounting table 7, a cleaning mechanism unit 8, and a base platform 9.

The set of ink jet head 1 comprises ink jet heads 1a that discharge ink that is a functional liquid supplied from an ink tank (not shown) from nozzles (discharge ports) thereof to pixels.

The mounting table 7 is for mounting a color filter substrate 101 that is to be manufactured by this manufacturing apparatus, comprising a mechanism for securely holding that substrate in a standard position.

The X-dimension drive shaft 4 is connected to an X-dimension drive motor 2. The X-dimension drive motor 2 is a stepping motor or the like which turns the X-dimension drive shaft 4 when supplied with an X-axis dimension drive signal from the controller 6. When the X-dimension drive shaft 4 is turned, the set of ink jet head 1 moves in the X-axis direction.

The Y-dimension guide shaft 5 is secured so that it does not move relative to the base platform 9. The mounting table 7 comprises a Y-dimension drive motor 3. The Y-dimension drive motor 3 is a stepping motor or the like which moves the mounting table 7 in the Y-axis direction when supplied with a Y-axis dimension drive signal from the controller 6.

In other words, by performing a drive in the X-axis direction and a drive in the Y-axis direction, the set of ink jet head 1 can be freely moved to any location on the color filter substrate 101. The relative speed of the set of ink jet head 1, relative to the color filter substrate 101, can also be determined by the control of the drive mechanisms in each axial dimension.

The controller 6 comprises a drive signal controller 31 (described further below) that supplies ink droplet discharge controlling signals to the set of ink jet head 1. The controller 6 also comprises a head position controller 32 (described further below) that supplies signals for controlling the positional relationship between the set of ink jet head 1 and the mounting table 7 to the X-dimension drive motor 2 and the Y-dimension drive motor 3.

The cleaning mechanism unit 8 comprises a mechanism for cleaning the set of ink jet head 1. The cleaning mechanism unit 8 comprises a Y-dimension drive motor (not shown). By the drive of this Y-direction drive motor, the cleaning mechanism unit 8 moves along the Y-dimension guide shaft 5. The movement of the cleaning mechanism unit 8 is also controlled by the controller 6.

(2. Ink Jet Read Configuration)

Figure 2:
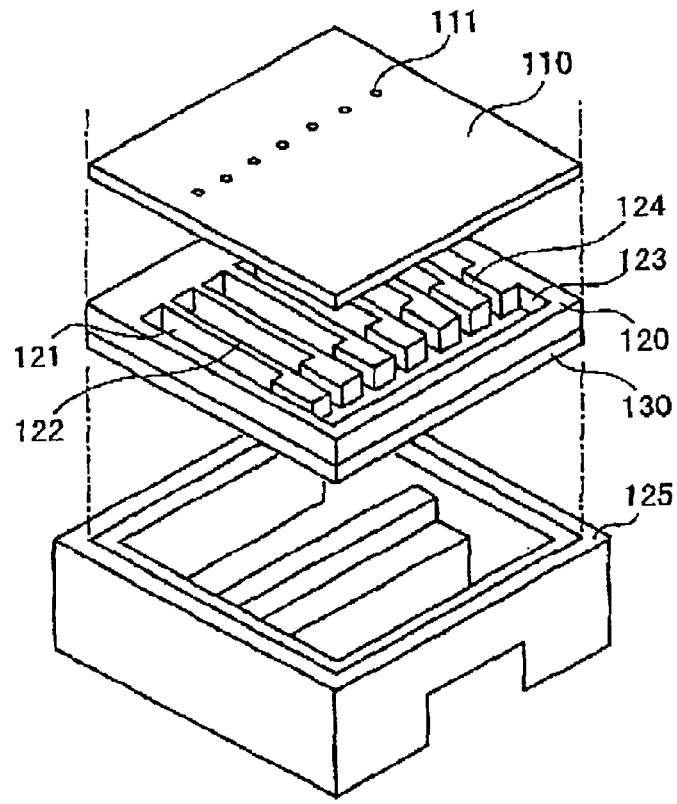
FIG. 2 is an explanatory diagram of the structure of an individual ink jet head 1a that configures a set of ink jet head 1.

FIG. 2 is an explanatory diagram of the structure of one of the individual ink jet heads 1a that configure a set of ink jet head 1. The ink jet head 1a is configured so as to comprise a nozzle plate 110, a pressure chamber base plate 120, and a vibration plate 130, as diagramed in the figure. This head configures an on-demand type of piezo jet head.

The pressure chamber base plate 120 comprises cavities (pressure chambers) 121, side walls (partitions) 122, a reservoir 123, and lead-in channels 124. The cavities 121 are formed by etching a substrate of silicon or the like and constitute space for storing ink or the like for the purpose of discharging it. The side walls 122 are formed so as make partitions between the cavities 121. The reservoir 123 forms a flow path for filling the cavities 121 with ink. The lead-in channels 124 are formed so that they can induct ink from the reservoir 123 into the cavities 121. The shapes of the cavities 121 and the like can be modified in various ways depending on the ink jet scheme. These may be made in the planar Kyser shape or in the cylindrical Zoltan shape, for example.

The nozzle plate 110 is affixed to one surface of the pressure chamber base plate 120 so that the nozzles 111 are positioned so as to correspond with the cavities 121, respectively, provided in the pressure chamber base plate 120. The number of the nozzles 111 is not limited to the number diagrammed, however, and it is possible, for example, to have 32 nozzles in one line. The pressure chamber base plate 120 to which the nozzle plate 110 is affixed is accommodated in a frame 125 to configure the ink jet head 1a.

The vibration plate 130 is affixed to the other surface of the pressure chamber base plate 120. In the vibration plate 130 are provided piezoelectric elements (not shown) at portions thereof corresponding respectively to the positions of the cavities 121. Also, a supply port (not shown) is provided in a portion of the vibration plate 130 corresponding to the position of the reservoir 123, making it possible to supply ink stored in an ink tank (not shown) to the interior of the pressure chamber base plate 120.

The plurality of nozzles 111 is divided into a plurality of groups and the number of the group is fewer than the number of the nozzles 111. Described in greater detail, the configuration is such that the positions on the ink jet heads 1a where the plurality of nozzles 111 is arranged are divided into a plurality of areas, and the nozzles belonging to each area of that plurality of areas belong to a single group. Described in even greater detail, these groups comprise a group made up of a set of nozzles positioned close to the supply port, and a group made up of a set of nozzles positioned far from the supply port. Provision is made so that ink is discharged from the nozzles belonging to the same group by control signals having the same waveform, which control signals can be regulated group by group.

(3. Control System Configuration)

Figure 3:
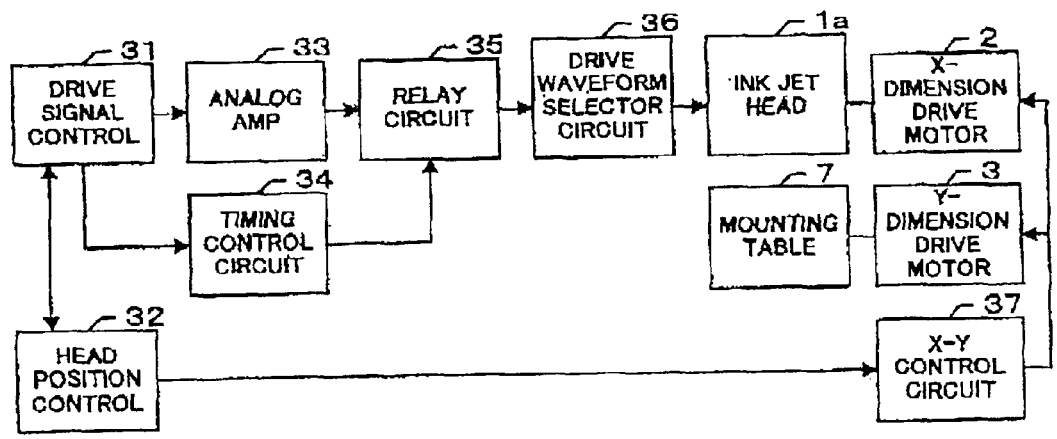
FIG. 3 is a block diagram of the configuration of a control system for the ink jet recording apparatus noted above.

FIG. 3 is a block diagram of the configuration of a control system for the ink jet recording apparatus 100 described above the control system of ink jet recording apparatus 100 comprises a drive signal controller 31 and a head position controller 32 that are electronic computers such as personal computers.

The drive signal controller 31 outputs a plurality of types of waveform for driving the ink jet heads 1a. The drive signal controller 31 also outputs bit map data indicating which color of ink, whether R, G, or B, to discharge to the pixels of the color filter.

The drive signal controller 31 is connected to an analog amp 33 and a timing control circuit 34. The analog amp 33 is a circuit for amplifying the plurality of waveform types noted above. The timing control circuit 34, which has a built in clock pulse circuit, is a circuit for controlling the ink discharge timing according to the bit map data noted above.

The analog amp 33 and the timing control circuit 34 are both connected to a relay circuit 35, and that relay circuit 35 is connected to a drive waveform selector circuit 36. The relay circuit 35 sends signals output from the analog amp 33 to the drive waveform selector circuit 36 according to the timing signals output from the timing control circuit 34.

The drive waveform selector circuit 36 is a circuit for selecting, from the plurality of waveform types, waveforms for controlling the ink discharge from the ink jet heads 1a, and sending those to the ink jet heads 1a. The plurality of nozzles provided in the ink jet heads 1a are divided into a number of groups, that number being fewer than the number of nozzles, and one waveform is selected for each group. Which waveform of the plurality of waveform types to be selected for each group is set in the drive waveform selector circuit 36 on the basis of data on the quantity of ink discharged from each nozzle in the ink jet heads 1a as measured beforehand.

Figure 4:
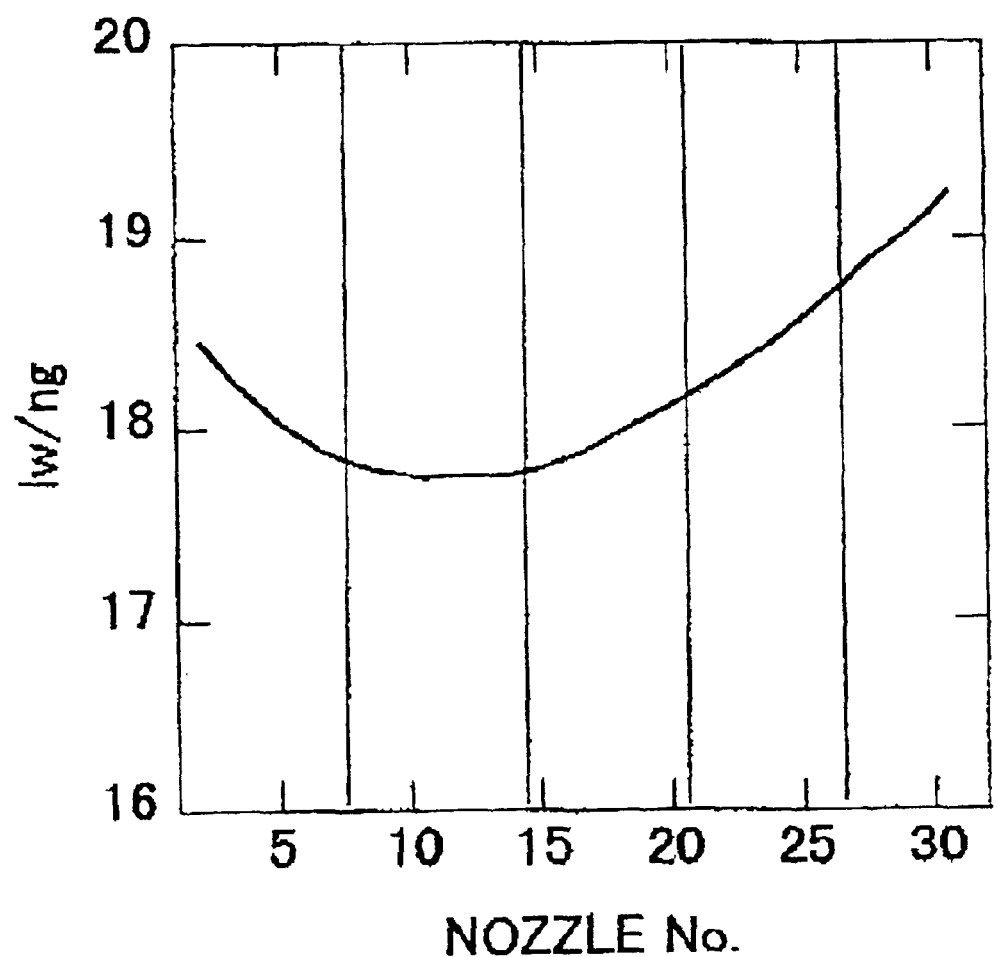
FIG. 4 is a graph representing one example of ink discharge quantity distribution for the nozzles in the ink jet head noted above.

FIG. 4 is a graph representing one example of ink discharge quantity distribution for the nozzles in the ink jet head described above. On the horizontal axis are plotted the nozzle numbers applied according to the arrangement of the plurality of nozzles provided in the ink jet head 1a, while on the vertical axis is plotted the discharge quantity (ng) per droplet of ink discharged from the nozzles when the same drive waveform is used for discharging ink from the nozzles.

In this ink jet head, a single supply port is provided for supplying ink to the reservoir common to the nozzles. That supply port is positioned near the nozzles numbered 8 through 15. As indicated in this figure, the ink discharge quantity tends to be lower in the vicinity of the supply port, while that ink discharge quantity tends to be higher in the vicinities of the two ends which are far from the supply port.

Accordingly, it is only necessary to select a waveform for suppressing the discharge quantity at the nozzles which are far from the supply port, positioned in the vicinities of the two ends of the ink jet head, and to select a waveform that will make the discharge quantity greater at the nozzles near the supply port, positioned near the center. If, in this manner, the tendency of the discharge quantity to increase or decrease according to the position of the nozzle is used, the positions where the nozzles are provided are divided into a plurality of areas, and a waveform is determined for each area thought to exhibit a mutually similar discharge trend, variation in discharge quantity can be adequately suppressed, without deriving compensation quantities for each individual nozzle, and a simple configuration, in terms of the apparatus, can be realized.

The head position controller 32, which is a circuit for controlling the positional relationship between the ink jet heads 1a and the mounting table 7 (together with the color filter substrate mounted thereon), works in conjunction with the drive signal controller 31 to effect control so that ink discharged from the ink jet heads 1a reaches prescribed locations on the color filter substrate. The head position controller 32 is connected to an X-Y control circuit 37 and sends information relating to head positions to that X-Y control circuit 37.

The X-Y control circuit 37 is connected to the X-dimension drive motor 2 and the Y-dimension drive motor 3, and sends signals for controlling the position of the ink jet heads 1a in the X-axis dimension and the position of the mounting table 7 in the Y-axis dimension, based on signals from the head position controller 32, to the X-dimension drive motor 2 and the Y-dimension drive motor 3.

(4. Functional Liquid Applied Substrate Configuration)

Figure 5:
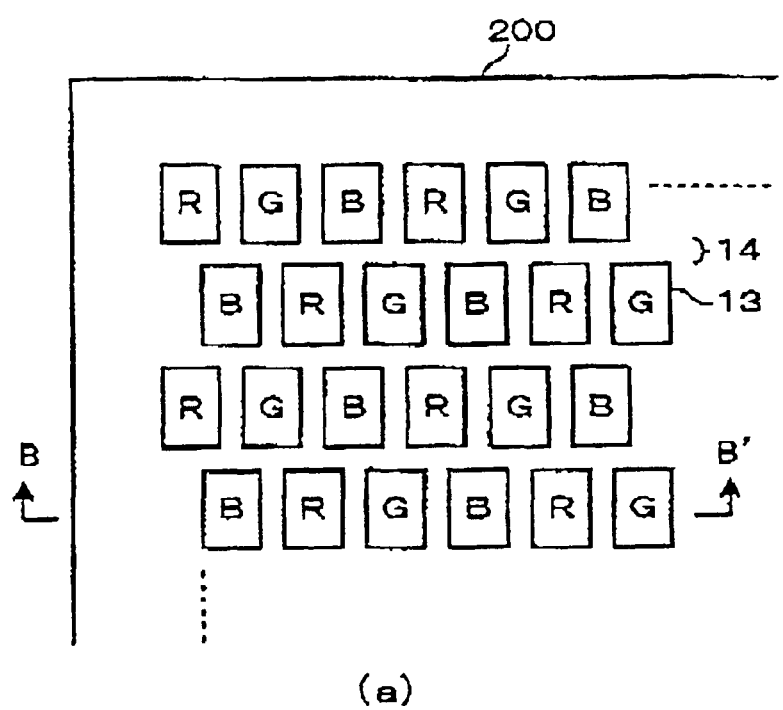
FIG. 5 is an enlarged partial diagram of a color filter that is a functional liquid applied substrate manufactured by a manufacturing apparatus and manufacturing method relating to the embodiment noted above.
Figure 5:
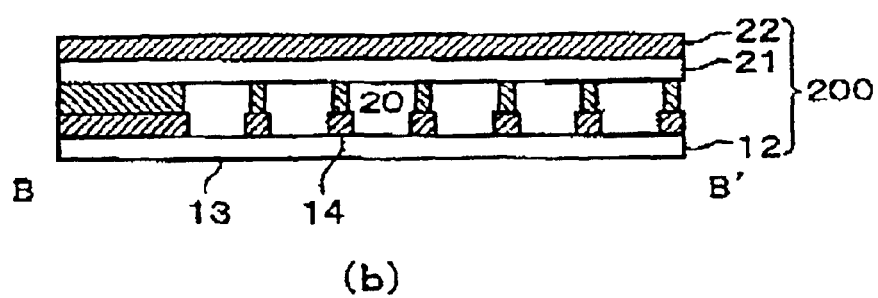

FIG. 5 is an enlarged partial diagram of a color filter that is a functional liquid applied substrate manufactured by the manufacturing apparatus and manufacturing method relating to the embodiment described above. FIG. 5(a) is a plan, while FIG. 5(b) is a cross-sectional view at the B–B' line in FIG. 5(a). Some of the hatching in portions of the cross-sectional view is omitted.

As diagrammed in FIG. 5(a), the color filter 200 comprises pixels 13 lined up in a matrix form, with the boundaries between pixels demarcated by partitions 14. Into each individual pixel 13 is inducted ink of one or other of the colors red (R), green (G), and blue (B). In this example, the arrangement of red, green, and blue is made the so-called delta arrangement, but this may be some other arrangement such as a strip arrangement or mosaic arrangement or the like.

As diagrammed in FIG. 5(b), the color filter 200 comprises a light transmitting substrate 12 and light blocking partitions 14. The portions where no partition 14 is formed (or where partition is removed) configure the pixels 13 noted above. The inks of several colors inducted to these pixels 13 configure coloring layers 20. An overcoat layer 21 and electrode layer 22 are formed on top of the partitions 14 and coloring layers 20.

(5. Functional Liquid Applied Substrate Manufacturing Method)

Figure 6:
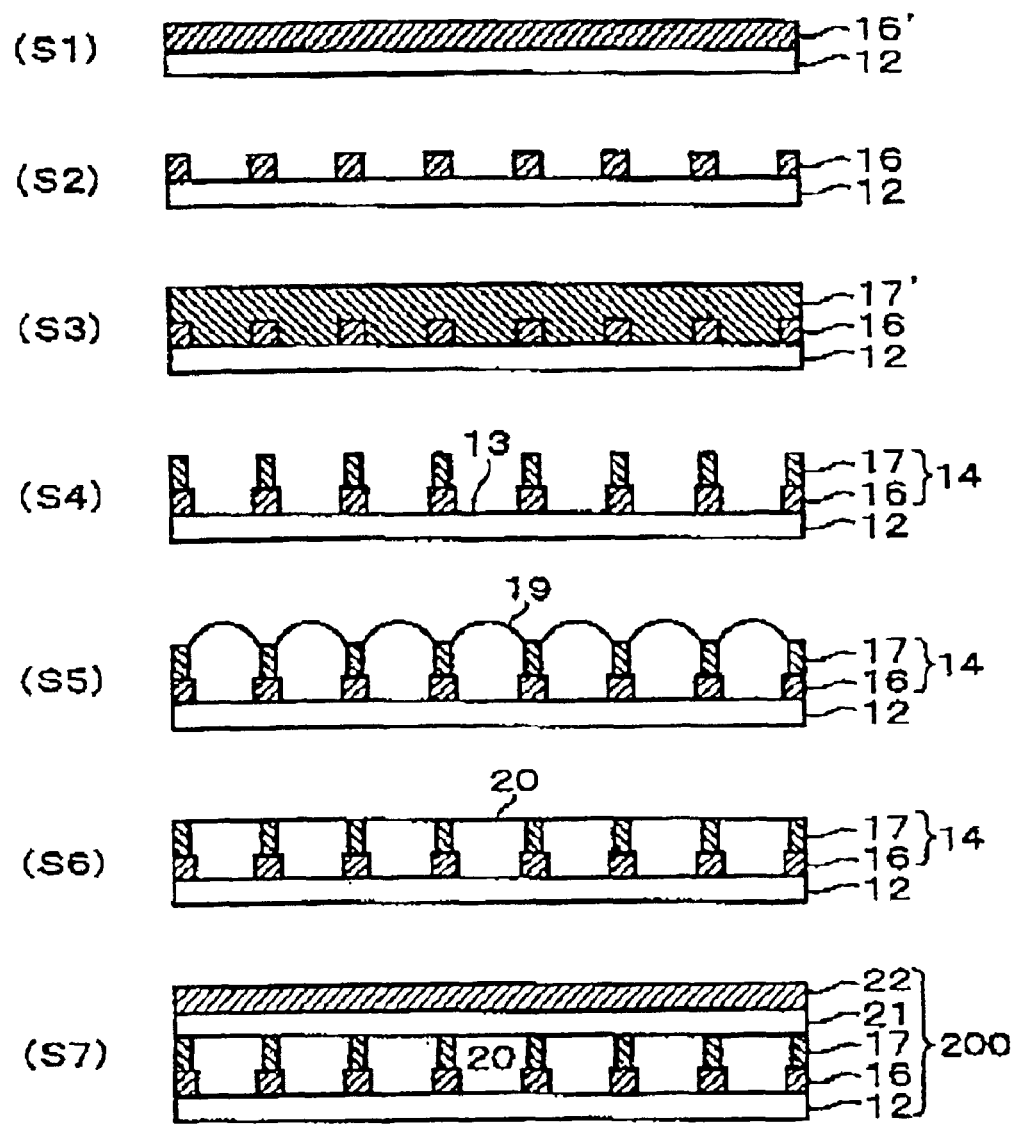
FIG. 6 is a set of cross-sectional diagrams of the manufacturing processes for the color filter noted above.

FIG. 6 is a set of cross-sectional diagrams of the manufacturing processes for the color filter described above. Some of the hatching in portions of the cross-sectional views is omitted. Based on this figure, an example of the manufacturing method for the color filter is now described in specific terms.

(5-1. Bank Formation and Surface Processing Process)

The surface of a transparent substrate 12 made of non-alkaline glass, having a film thickness of 0.7 mm, longitudinal dimension of 38 cm, and lateral dimension of 30 cm, is washed with a washing liquid wherein 1 wt. % of hydrogen peroxide was added to hot concentrated sulfuric acid, rinsed with pure water, and air-dried to obtain a clean surface. Onto that surface is formed a chromium film, by a sputtering process, to an average film thickness of 0.2 μm, to yield a metal layer 16' (S1 in FIG. 6).

This substrate is dried for 5 minutes at 80° C. on a hot plate, after which a photoresist layer (not shown) is formed by spin coating onto the surface of the metal layer 16'. On this substrate surface, a mask film having a prescribed matrix pattern shape is securely affixed, and exposure is performed with UV radiation. Next, that is immersed in an alkaline developing liquid containing potassium hydroxide in a ratio of 8 wt. %, the portion of the photoresist not exposed is removed, and the resist layer is patterned. Following that, the exposed metal layer is removed by etching with an etching liquid the main component of which is hydrochloric acid. Thus the light blocking layer (black matrix) 16 having the prescribed matrix pattern can be obtained (S2 in FIG. 6). The light blocking layer 16 has a film thickness of about 0.2 μm and a width of about 22 μm.

On that substrate is then coated a negative type transparent acrylic photosensitive resin composition 17', again-by spin coating (S3 in FIG. 6). After pre-baking that for 20 minutes at 100° C., UV exposure is performed using a mask film whereon is drawn a prescribed matrix pattern shape. The unexposed portion of the resin is developed, again using an alkaline developing liquid, and, after rinsing with pure water, spin drying is performed. For the final drying, after-baking is performed for 30 minutes at 200° C., and the resin portions are thoroughly hardened. Thereby, the bank layer 17 is formed, and both the light blocking layer 16 and the partitions 14 constituted by the bank layer 17 are formed (S4 in FIG. 6). The average film thickness of this bank layer 17 is 2.7 μm. The width of the bank layer 17 is about 14 μm.

In order to improve the ink wetting properties of the coloring layer formation area (and particularly the exposed surface of the glass substrate 12) demarcated by the bank layer 17 and the light blocking layer 16 so obtained, dry etching, that is a plasma process under normal atmospheric pressure, is performed. More specifically, a high voltage is applied to a gas mixture wherein 20% oxygen has been added to helium, the plasma atmosphere is formed into an etching spot in normal atmospheric pressure, and the substrate is passed below that etching spot and etched.

(5-2. Functional Liquid Induction Process)

Next, ink (functional liquid) is inducted by an ink jet method inside the pixels 13 formed by the demarcation of the partitions 14 (S5 in FIG. 6). In the ink jet recording head, minute ink droplets are selectively cast, 10 droplets per coloring layer formation area, using a precision head wherein a piezoelectric effect is employed. The drive frequency is set to 14.4 kHz, that is, the ink droplet discharge interval is set at 69.5 μsec. The distance between the head and the target is set at 0.3 mm. Not only the ink properties but the waveform (inclusive of voltage) that drives the piezo elements of the head is crucial for the flight speed from the head to the coloring layer formation area (target) and for preventing the occurrence of flight curvature and what are called satellites (droplets that separate and go astray). The waveforms that drive the ink jet head, as noted earlier, are sent via the drive signal controller 31, analog amp 33, relay circuit 35, and drive waveform selector circuit 36 to the ink jet head.

Figure 7:
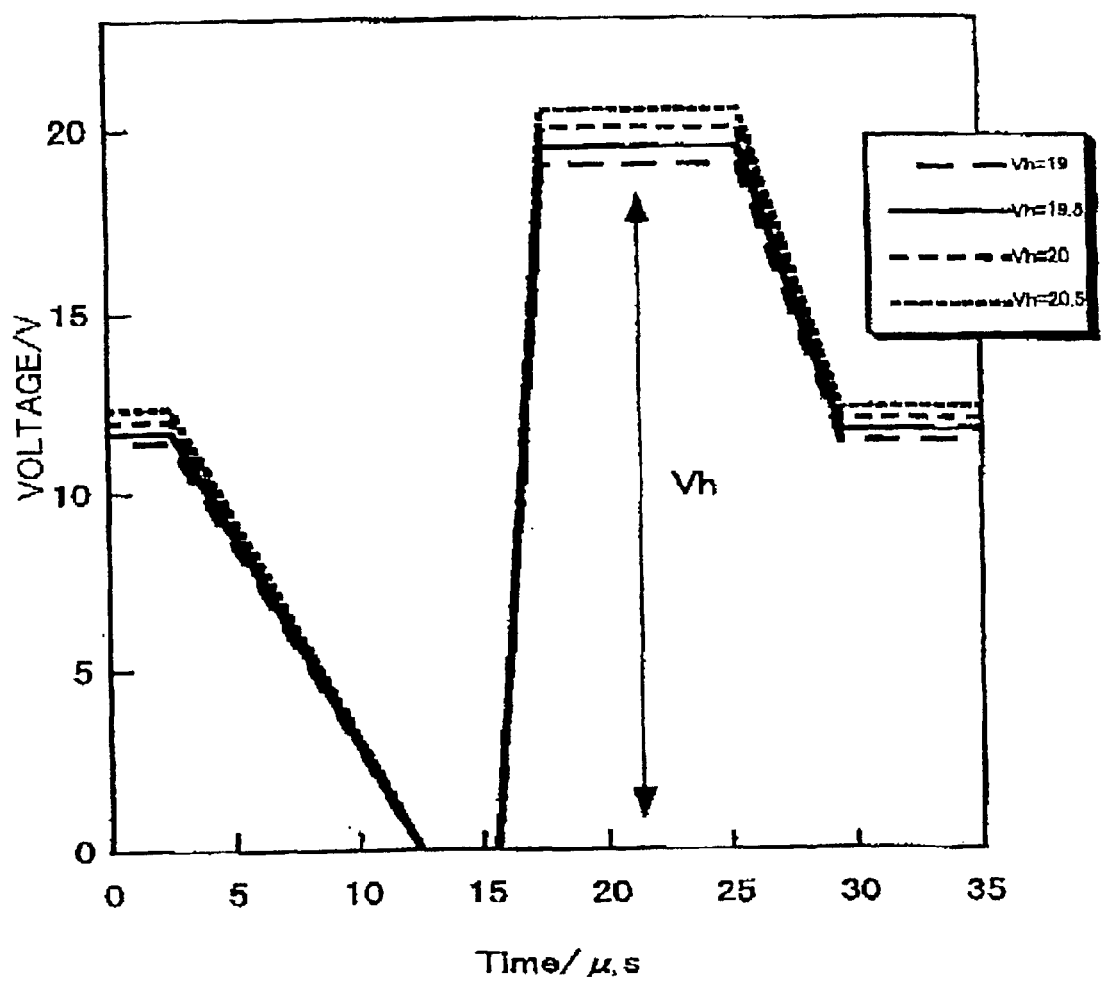
FIG. 7 is a waveform graph representing examples of signal waveforms of a plurality of types input to a drive waveform selection circuit 36.

FIG. 7 is a waveform graph representing examples of signal waveforms of a plurality of types input to the drive waveform selection circuit 36 described earlier. Time (μsec) is plotted on the horizontal axis, and the difference (V) from the minimum value of the applied voltage is plotted on the vertical axis. Every one of the four types of waveform represented here is what is called a pull-push-pull type, wherewith, in the first stage where the voltage is caused to drop (pull), the ink is pulled into the meniscus, in the second stage where the voltage is caused to rise (push), the ink is discharged, and in the third stage where the voltage is again caused to drop (pull), the meniscus vibration is caused to very rapidly diminish. Here, as plotted in the figure, four types of waveform are generated such that the difference (vh) between the maximum value and minimum value of the applied voltage becomes 19 V, 19.5 V, 20 V, and 20.5 V, respectively. When Vh is lowered, the ink discharge quantity becomes smaller, and when Vh is raised, the ink discharge quantity becomes larger. Thus the ink discharge quantity can be controlled by the voltage level.

The drive waveform selector circuit 36 selects a waveform, from among the four types of waveform noted above, that control the ink discharge from the ink jet head 1a, and sends that waveform to the ink jet head 1a. More particularly, the 32 nozzles provided in the ink jet head 1a are divided into a total of five groups, comprising 7 nozzles, 7 nozzles, 6 nozzles, 6 nozzles, and 6 nozzles, respectively, and one waveform is selected for each group, respectively.

Figure 8:
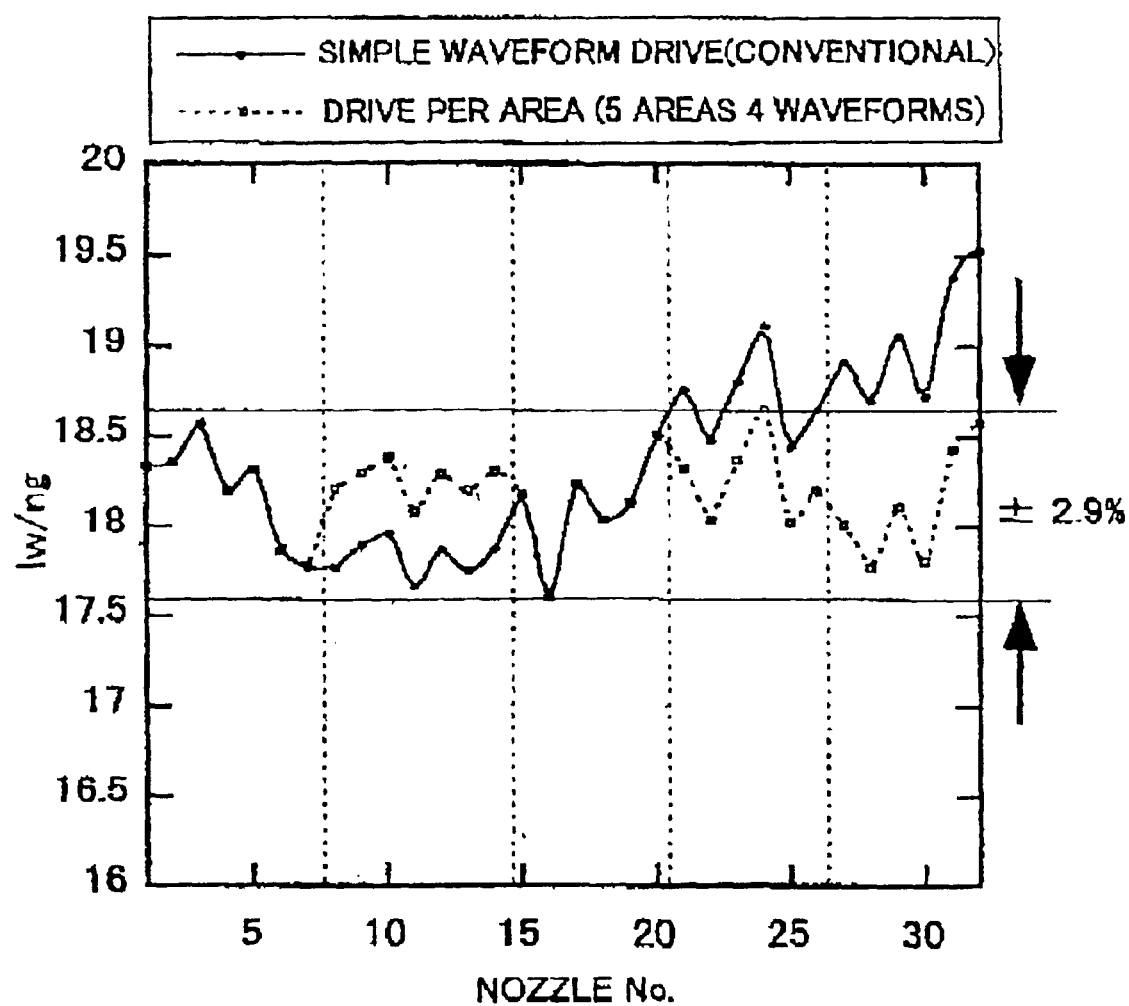
FIG. 8 is a graph wherein are plotted pre-compensation and post-compensation data for the ink discharge quantity per droplet from the nozzles in the ink jet head 1a in this embodiment.

FIGS. 8 is a graph wherein are plotted pre-compensation and post-compensation data for the ink discharge quantity per droplet from the nozzles in the ink jet head 1a in this embodiment. On the horizontal axis are plotted nozzle numbers applied temporarily according to the arrangement of the nozzles, while on the vertical axis is plotted the discharge quantity (ng) per droplet from the nozzles. The pre-compensation data are indicated by the solid curved line, while the post-compensation data are indicated by the dotted curved line. The discharge quantity per ink droplet was calculated from the speed of the ink droplet discharged from the nozzle.

Prior to compensation, among the four types of waveform, the drive waveform in which Vh=20 V was used for all of the nozzles. As a consequence, the ink maximum discharge quantity from the nozzles was approximately 19.5 ng (nozzle No. 32), while the minimum was approximately 17.6 ng (nozzle No. 16). The ink quantity variation was ±6.0%.

In order to compensate for this ink quantity variation, the Vh of the signal for controlling the ink discharges from the nozzle group made up of No. 8 through No. 14 was made 20.5 V, the Vh of the signal for controlling the ink discharges from the nozzle group made up of No. 21 through No. 26 was made 19.5 V, the Vh of the signal for controlling the ink discharges from the nozzle group made up of No. 27 through No. 32 was made 19 V, and the Vh was left as is at 20 V for all other nozzles. As a result, the maximum ink discharge quantity from the nozzles became approximately 18.6 ng (nozzle No. 24) and the minimum became approximately 17.6 ng (nozzle No. 16). The ink quantity variation was thus improved to ±2.9%.

The variation in the flight speed of the ink droplets discharged from the nozzles was ±10% prior to compensation, but ±5% after compensation. As a consequence of making the flight speed of the ink droplets more uniform in this manner, it became possible to raise the manufacturing speed because it became harder for the impact positions of the ink droplets to become displaced even when moving the mounting table at higher speeds.

Using the waveforms selected as described in the foregoing, ink droplets are applied simultaneously in the three colors of red, green, and blue, and ink is applied in the prescribed color arrangement pattern. The ink used is made, for example, by dispersing an inorganic pigment in a polyurethane resin oligomer, then adding cyclohexanone and butyl acetate as low boiling point solvents and butylcarbitol acetate as a high boiling point solvent, and finally adding 0.01 wt. % of a nonionic surfactant as a dispersant to make the viscosity 6 to 8 centipoise.

(5-3. Drying and Hardening Processes)

Next, the applied ink is dried. First, the ink layer 19 is set by allowing it to stand for 3 hours in the natural atmosphere. Then heating is performed for 40 minutes at 80° C. on a hot plate. Finally, heating is performed for 30 minutes at 200° C. in an oven to perform the ink layer 19 hardening process to yield the coloring layers 20 (S6 in FIG. 6).

On the substrate described above, a transparent acrylic resin coating is spin-coated to form the overcoat layer 21 having a smooth surface. Then, on top of that, the electrode layer 22 consisting of indium tin oxide (ITO) is formed in a prescribed pattern to make the color filter 200 (S7 in FIG. 6).

(6. Display Device Configuration)

Figure 9:
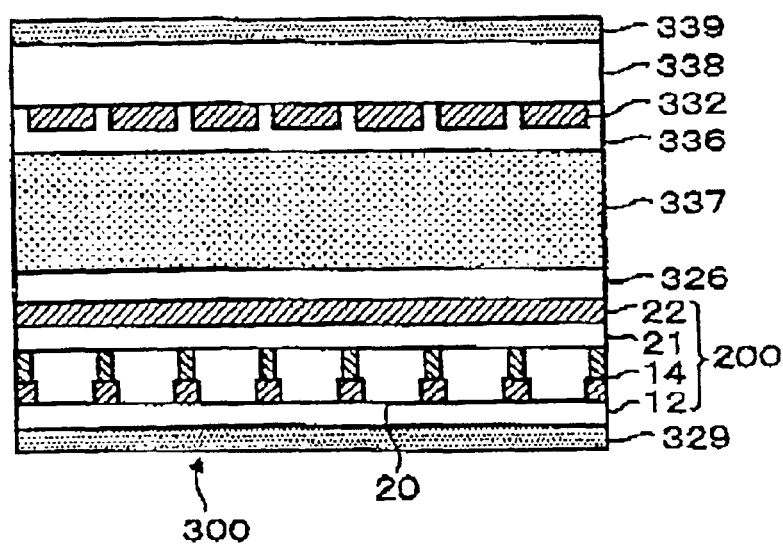
FIG. 9 is a cross-sectional diagram of a color liquid crystal display device that is an electro-optical apparatus manufactured by the manufacturing method in one embodiment of the present invention.

FIG. 9 is a cross-sectional diagram of a color liquid crystal display device that is an electro-optical apparatus manufactured by the manufacturing method in one embodiment of the present invention. Some of the hatching in portions of the cross-sectional view is omitted. In this color liquid crystal display device 300, because the color filter 200 manufactured by the method described above is used, the functional liquid discharge quantity is made more uniform between the pixels, and the film thickness of the functional liquid after drying and hardening becomes uniform between the pixels, whereupon images of good picture quality can be displayed therewith.

This color liquid crystal display device 300 is configured by combining the color filter 200 with an opposing substrate 338, and sealing therebetween a liquid crystal composition 337. On the inside surface of the one substrate 338 of the color liquid crystal display device 300, TFT (thin film transistor) elements (not shown) and pixel electrodes 332 are formed in a matrix form. For the other substrate, the color filter 200 is deployed so that the red, green, and blue coloring layers 20 are arranged at positions corresponding to the pixel electrodes 332.

On the surfaces that are opposed to the substrate 338 and the color filter 200, respectively, orientation films 326 and 336 are formed. These orientation films 326 and 336 are subjected to a rubbing treatment, and the liquid crystal molecules can be arranged in a certain direction. To the outer surfaces of the substrate 339 and the color filter 200, furthermore, polarizing panels 329 and 339 are bonded, respectively. Also, a fluorescent lamp (not shown) and a scattering plate combination is commonly used for a backlight, and the display is effected by causing the liquid crystal composition 337 to function as an optical shutter that changes the transmissivity of the backlight.

Furthermore, the electro-optical apparatus is not limited in the present invention to the color liquid crystal display device described above, but various apparatuses can be adopted, such as a thin picture-tube, for example, or a small television receiver wherein a liquid crystal shutter or the like is used, or an electro-optical apparatus wherein any of various electro-optical means are used such as an EL display device, plasma display, CRT display, or field emission display (FED).

(7. Electronic Equipment Configuration)

Figure 10:
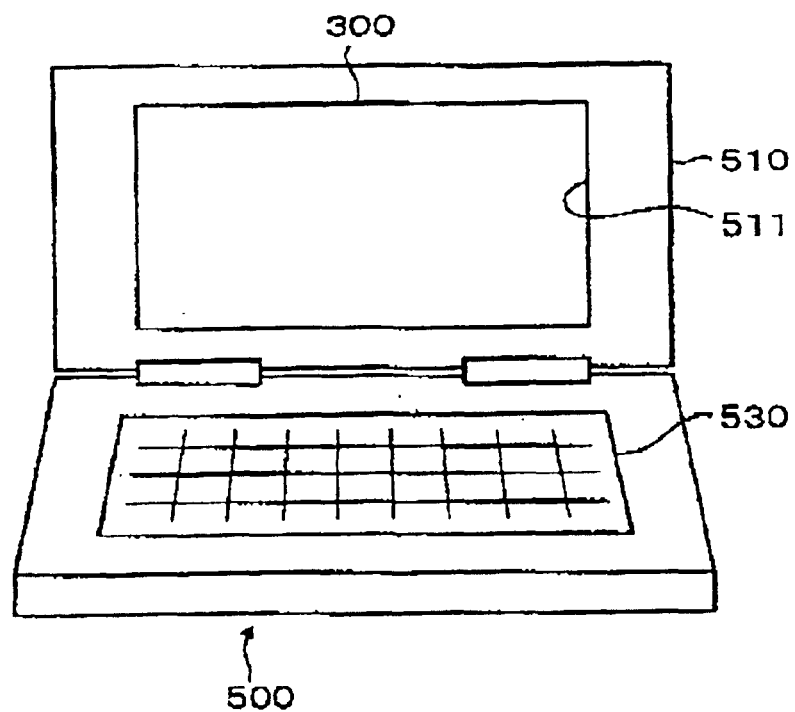
FIG. 10 is a diagonal view of a notebook style personal computer manufactured by the manufacturing method of One embodiment of the present invention.

FIG. 10 is a diagonal view of a notebook style personal computer manufactured by the manufacturing method of one embodiment of the present invention. In this personal computer 500, because the color liquid crystal display device 300 described above is used as the display unit, the functional liquid discharge quantity is made more uniform between the pixels, and the film thickness of the functional liquid after drying and hardening becomes uniform between the pixels, whereupon images of good picture quality can be displayed therewith.

As diagrammed in this figure, the color liquid crystal display device 300 is accommodated in a case 510, and the configuration is such that the display area of the color liquid crystal display device 300 is exposed through an opening 511 formed in the case 510. The personal computer 500 also comprises a keyboard 530 as an input unit.

This personal computer 500 is configured so as to contain, in addition to the color liquid crystal display device 300, a display signal generator comprising various circuits (not shown) such as a display information output source; display information processing circuit, and clock signal generation circuit, together with a power supply circuit for supplying electric power to those circuits. In the color liquid crystal display device 300, display images are formed by the supply of display signals generated by the display signal generator based on information such as that input from the input unit 530, for example.

The electronic equipment in which the electro-optical apparatus relating to this embodiment is incorporated is not limited to a personal computer, but may be any of various electronic equipment such as a portable telephone, electronic notebook, pager, POS terminal, IC card, mini disk player, liquid crystal projector, engineering work station (EWS), word processor, television receiver, viewfinder-type or monitor direct-view type video tape recorder, electronic desktop calculator, car navigation unit, device equipped with a touch panel, timepiece, or game equipment.

(8. Other Embodiments)

The functional liquid applied substrate manufactured by the manufacturing apparatus and method of the present invention is not limited to the color filter described in the foregoing, moreover, but may also be an EL element substrate. In that case, a solution of an electroluminophor may be used as the functional liquid.

The functional liquid applied substrate manufactured by the manufacturing apparatus and method of the present invention may also be a substrate whereon a conducting wiring pattern is formed. In that case, what is used as the functional liquid is an electrically conducting particle dispersion solution wherein a powdered form of an electrically conducting substance such as gold (Au), silver (Ag), copper (Cu), platinum (Pt), or palladium (Pd), a binder for bonding the powder, and a dispersant for dispersing the powder uniformly, and the like, are dissolved in a solvent.

Then, the electrically conducting particle dispersion solution is applied, using the ink jet head of the present invention, so that a prescribed conducting wiring pattern is formed on the substrate. After that, the functional liquid is dried and hardened and the conducting wiring pattern is formed.

The functional liquid applied substrate may also be a substrate whereon a semiconductor device is formed or a substrate whereon a memory configured by semiconductor devices is formed. In that case, a solution containing an inorganic semiconductor material, organic semiconductor material, electrically conductive polymer, or ferroelectric material or the like is used as the functional liquid.

The functional liquid applied substrate may also be a substrate used as a sample in genetic analysis. In that case, a solution containing protein or deoxyribonucleic acid (DNA) is used as the functional liquid.

The functional liquid applied substrate may also be a substrate that configures an electronic device such as the prime example of a substrate configuring a display electron gun. In that case, a solution containing carbon nanotubes is used as the functional liquid.

The functional liquid applied substrate may also be a substrate that configures a catalyst in a fuel cell, or a catalyst used in non-electric field plating, or a field emission display (FED). In that case, a solution containing a precious metal and a precious metal salt or an oxide thereof is used as the functional liquid.

Based on the present invention, an ink jet recording apparatus capable of making the discharge quantities of functional liquids more uniform by simple procedures and with a simple configuration, and a functional liquid applied substrate manufacturing method, are provided.

What is claimed is:

1. An ink jet recording apparatus comprising a plurality of nozzles for discharging a functional liquid, said apparatus comprising:
    a supply port;
    a plurality of nozzle groups into which said plurality of nozzles are divided, the number of nozzle groups being fewer than the number of said nozzles, wherein each group contains nozzles located next to each other, and
    a drive controller configured to regulate discharge quantity and flight speed of said functional liquid discharged from said nozzles for each nozzle group by voltage level applied to piezoelectric elements corresponding to said nozzle,
    wherein said drive controller determines a waveform for each nozzle group based on a distance between the supply port and each nozzle group, thought to exhibit a mutually similar discharge trend among said nozzle groups.

2. The ink jet recording apparatus according to claim 1, wherein said functional liquid is ink that is usable to manufacture a color filter.

3. The ink jet recording apparatus according to claim 1, wherein said functional liquid is a solution of electroluminophor that is usable to manufacture an EL element substrate.

4. The ink jet recording apparatus according to claim 1, wherein said functional liquid is an electrically conducting particle dispersion solution that is usable to manufacture a substrate comprising a conducting wiring pattern.

5. The ink jet recording apparatus according to claim 1, wherein positions on ink jet head on which said plurality of nozzles is arranged are divided into a plurality of areas, and nozzles belonging to each area are made to belong to a single group.

6. The ink jet recording apparatus according to claim 1,
    wherein said ink jet head on which said plurality of nozzles is arranged comprises cavities provided for each of said nozzles, a reservoir communicating to said cavities and common to said nozzles, and a supply port for supplying said functional liquid to said reservoir; and
    wherein said plurality of groups comprise at least a first group comprising nozzles of said plurality of nozzles positioned close to said supply port, and a second group comprising nozzles of said plurality of nozzles positioned far from said supply port.

7. The inkjet recording apparatus according to claim 1, wherein the voltage level applied to piezoelectric elements is different for at least two groups of the plurality of groups.

8. A method for manufacturing a functional liquid applied substrate by an ink jet recording apparatus that has a plurality of nozzles capable of discharging a functional liquid, comprising the steps of:
    dividing said plurality of nozzles into a plurality of nozzle groups, the number of nozzle groups being fewer than number of said nozzles, wherein each group contains nozzles located next to each other;
    regulating with a drive controller, for each nozzle group, voltage level applied to piezoelectric elements corresponding to said nozzles to control discharge quantity and flight speed of said functional liquid from said nozzles;
    determining with the drive controller, a waveform for each nozzle group based on a distance between a supply port and each nozzle group, thought to exhibit a mutually similar discharge trend among said nozzle groups; and
    discharging said functional liquid into pixels formed on a substrate.

9. The method for manufacturing a functional liquid applied substrate according to claim 8, wherein positions on ink jet head on which said plurality of nozzles is arranged are divided into a plurality of areas, and nozzles belonging to each area are made to belong to a single group.

10. The method for manufacturing a functional liquid applied substrate according to claim 8,
    wherein said ink jet head on which said plurality of nozzles is arranged comprises cavities provided for each of said nozzles, a reservoir communicating to said cavities and common to said nozzles, and a supply port for supplying said functional liquid to said reservoir, and
    wherein said plurality of groups comprise at least a first group comprising nozzles of said plurality of nozzles positioned close to said supply port, and a second group comprising nozzles of said plurality of nozzles positioned far from said supply port.

11. A method for manufacturing a device comprising a functional liquid applied substrate manufactured by the method according to claim 8.

12. A method for manufacturing electronic equipment wherein an electro-optical apparatus manufactured by the method according to claim 11 is used.

13. A device comprising a functional liquid applied substrate manufactured by the method according to claim 8.

14. The method for manufacturing a functional liquid applied substrate according to claim 8, wherein the voltage level applied to piezoelectric elements is different for at least two groups of the plurality of groups.

* * * * *